(12) United States Patent
Kanai

(10) Patent No.: US 6,875,530 B2
(45) Date of Patent: Apr. 5, 2005

(54) FUEL CELL AND METHOD OF OPERATING THE SAME

(75) Inventor: Chiaki Kanai, Kanagawa (JP)

(73) Assignee: Sony Corporation (JP)

( * ) Notice: Subject to any disclaimer, the term of this patent is extended or adjusted under 35 U.S.C. 154(b) by 301 days.

(21) Appl. No.: 10/219,037

(22) Filed: Aug. 14, 2002

(65) Prior Publication Data

US 2003/0035987 A1 Feb. 20, 2003

(30) Foreign Application Priority Data

Aug. 16, 2001 (JP) .................................... P2001-247400

(51) Int. Cl.[7] .............................................. H01M 8/04
(52) U.S. Cl. ............................ 429/13; 429/38; 429/39
(58) Field of Search ........................... 429/13, 34, 38, 429/39

(56) References Cited

U.S. PATENT DOCUMENTS 6,475,655 B1 * 11/2002 Nakanishi et al. ........ 429/13 X
6,582,842 B1 * 6/2003 King ........................ 429/38 X
6,696,192 B2 * 2/2004 Kanai et al. .................. 429/34

FOREIGN PATENT DOCUMENTS

JP     2000-251913     9/2000     ............ H01M/8/04
JP     2001-093545     6/2001     ............ H01M/8/02

* cited by examiner

Primary Examiner—Stephen J. Kalafut
(74) Attorney, Agent, or Firm—Bell, Boyd & Lloyd, LLC

(57) ABSTRACT

Fuel cells and methods of operating same are provided. In an embodiment, fuel cells include cylinders each provided with a spiral form groove portion in the surface thereof and disposed in air supply or exhaust pipes are rotated, wherein the amount of air supplied to power generation cells can be sequentially increased on a cell-by-cell basis, and water formed at the power generation cells can be discharged by sequentially raising the pressure of air. In this regard, each power generation cell is constantly supplied with not less than a fixed quantity of air, thus stable power generation can be achieved.

13 Claims, 10 Drawing Sheets

Prior Art

F I G. 7

*Prior Art*

FIG. 8

*Prior Art*

FIG. 9

Prior Art

FIG. 10

FUEL CELL AND METHOD OF OPERATING THE SAME

RELATED APPLICATION DATA

The present application claims priority to Japanese Patent Application No. P2001-247400 filed on Aug. 16, 2001 herein incorporated by reference to the extent permitted by law.

BACKGROUND OF THE INVENTION

The present invention relates to a fuel cell of the stack type in which power generation cells are stacked, and a method of operating the same. More particularly, the invention relates to a fuel cell in a stacked arrangement which includes an air supply/exhaust mechanism capable of sequentially removing water generated at air poles on a cell-by-cell basis, and a method of operating same.

Fuel cells can produce electrical energy from an electrochemical reaction between hydrogen and oxygen have been demanded to be enhanced in function and be further reduced in size and weight. Such fuel cells are desired as an alternative to fossil fuel energy systems which are typically used at present, such as internal-combustion engines. Since the voltage obtained from unit power generation cell of the power generation cells constituting a fuel cell is low, the fuel cell is generally arranged into a stack of a plurality of sheets of power generation cells and is so designed that the requisite amount of electrical energy can be obtained.

Generally, the power generation cells have gas conduits disposed in parallel relative to supply pipes for supplying hydrogen gas, which is a fuel, and oxygen gas, and the hydrogen gas and the oxygen gas are supplied through respective gas feed pipes for supplying the hydrogen gas and air. Also, the gas exhausted from the power generation cells is discharged into an exhaust pipe through gas conduits disposed in parallel relative to the exhaust pipe.

Figure 6:
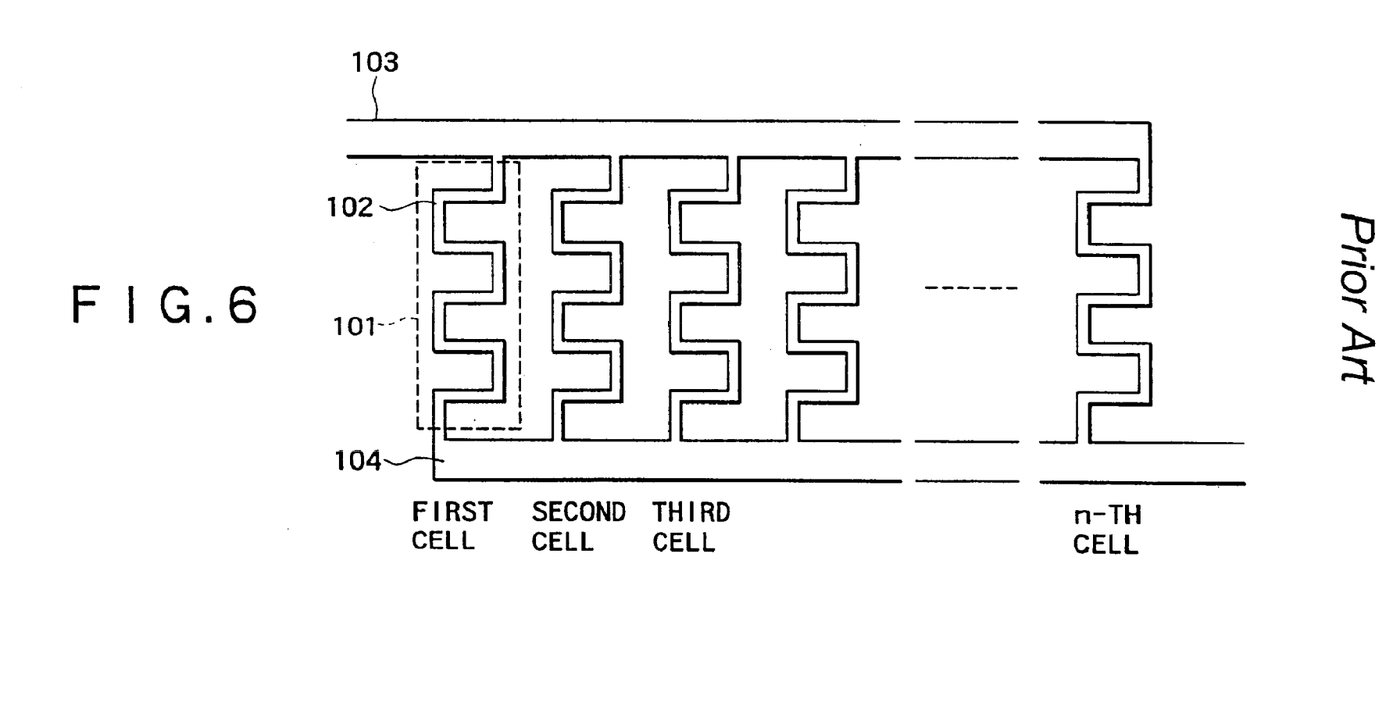
FIG. 6 is a schematic diagram showing a conventional fuel cell.
Figure 7:
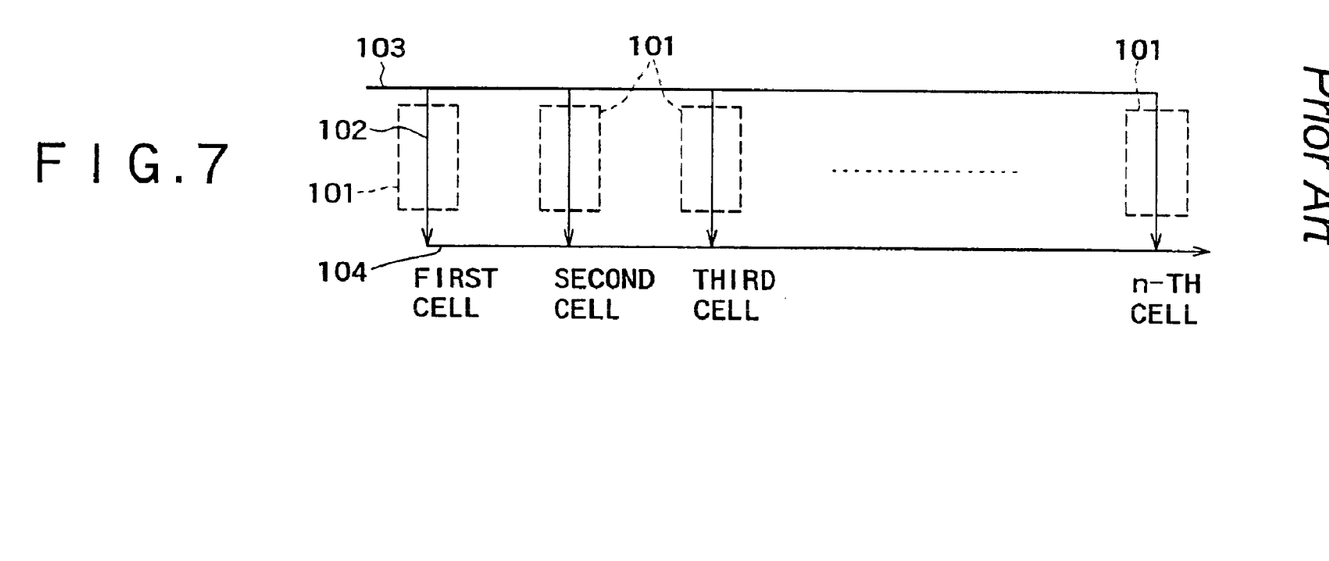
FIG. 7 is a schematic diagram showing a conventional fuel cell.

FIG. 6 is a schematic diagram showing the structure of a fuel cell including an air supply/exhaust device of the conventional type, and is a schematic structural diagram showing only the air supply side. Air is supplied into gas conduits 102 connected in parallel to an air supply pipe 103. Further, air is supplied through the gas conduits 102 into power generation cells 101, and the air having passed through each power generation cell 101 is discharged to the exterior through an air exhaust pipe 104. FIG. 7 is a schematic diagram of the structure of a fuel cell including an air supply/exhaust device of the conventional type shown in FIG. 6. The fuel cell having the conventional type air supply/exhaust device is generally constituted of four kinds of elements, namely, an air supply pipe 103, a plurality of power generation cells 101, gas conduits 102 and an air exhaust pipe 104, and air is simultaneously supplied from the air supply pipe 103 into each power generation cell 101, whereby the requisite amount of electrical energy can be taken out.

It is important for an energy supply system to be small in size, high in performance and so designed that degradation of performance during operation is restrained. When a fuel cell of the above-mentioned structure is used as an energy supply system, the reaction between hydrogen and oxygen results in formation of water as a by-product on the air pole side where oxygen is supplied, and the flow of air at the time of supplying oxygen-containing air to the power generation cells may be thereby hindered. Therefore, it is important to smoothly supply air into the gas conduits and to remove water.

There may be cases where, in the process of continuously performing power generation, water as the by-product stands as an obstacle to the flow of air through the gas conduits, so that stable power generation is not achieved and electrical energy is not taken out sufficiently. For achieving stable power generation, it may be contemplated to supply a sufficient quantity of air from the air supply pipe 103 into the gas conduits 102. However, when the number of the power generation cells 101 stacked is increased, the ratio of the quantity of air supplied into one power generation cell 101 to the quantity of air supplied from the air supply pipe 103 becomes small, so that much air must be supplied from the air supply pipe 103 into the gas conduits 102 in order to discharge water assuredly. In order to supply a sufficient quantity of air from the air supply pipe 103 into the gas conduits 102 so as to remove the water, the component parts constituting the fuel cell and the like are necessarily enlarged in size; thus, it has been difficult to manufacture a fuel cell small in size and high in performance.

Figure 8:
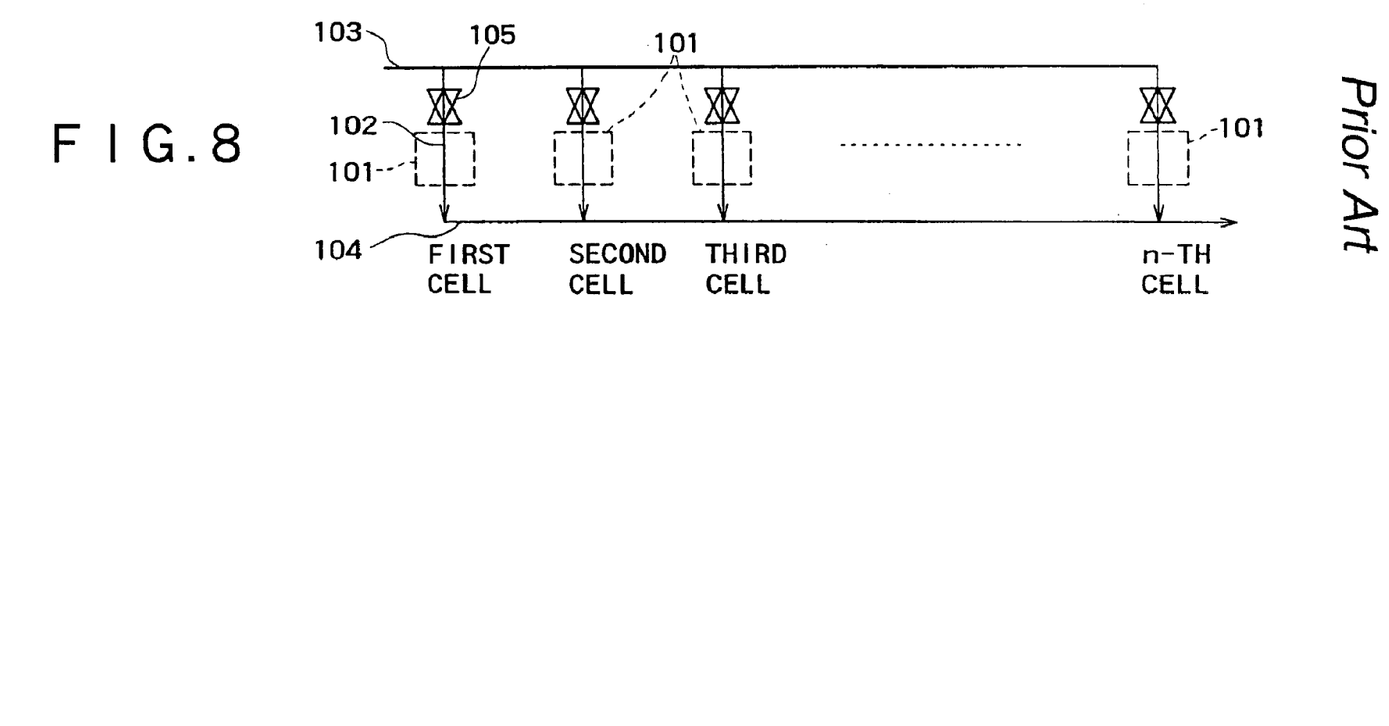
FIG. 8 is a schematic diagram showing a conventional fuel cell.

In order to securely discharge the water accumulated in the gas conduits 102 by supplying air, as shown in FIG. 8, valves 105 operated independently on the basis of each power generation cell 101 are provided at inlets of the gas conduits 102, and the valves 105 are opened and closed in a time-sharing manner. When air is supplied on the basis of each power generation cell 101 by opening and closing the valves 105, it is possible to supply air only to the relevant power generation cell 101 at the time when the valve 105 is opened, whereby water can be discharged. However, arrangement of the valves 105 for on the basis of each power generation valve 101 can provide a complicated structure and in increase in the number of component parts. Further, the power generation cells 101 corresponding to the closed valves 105 are not supplied with air, and, therefore, stable power generation cannot be achieved.

Figure 9:
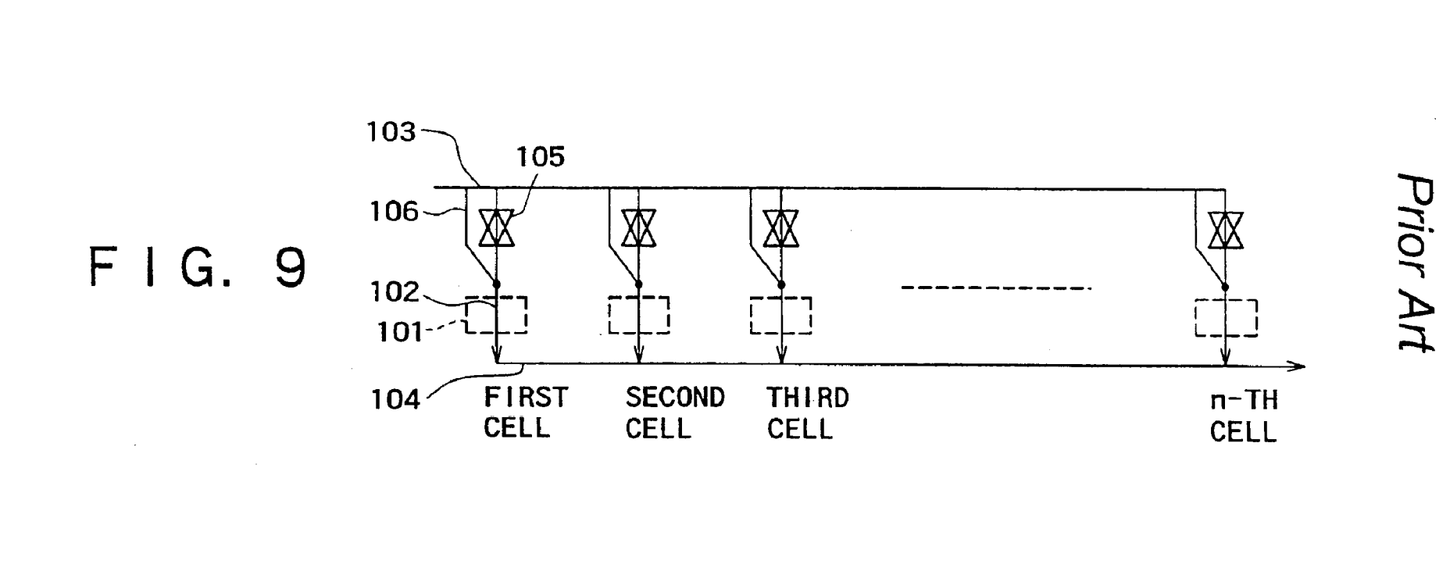
FIG. 9 is a schematic diagram showing a conventional fuel cell.
Figure 10:
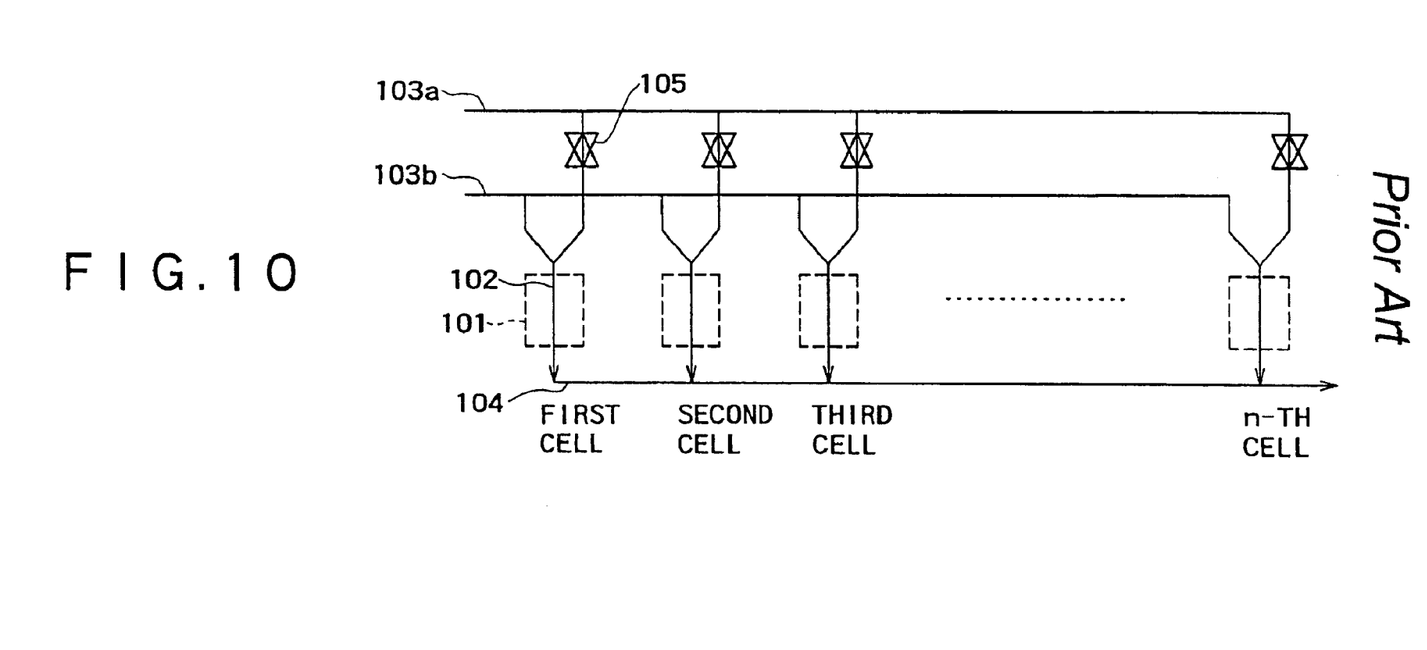
FIG. 10 is a schematic diagram showing a conventional fuel cell.

In addition, there may be contemplated an air supply system in which, as shown in FIG. 9, bypass lines 106 are provided in parallel to the valves 105 so as to constantly supply a fixed quantity of air, whereby the fixed quantity of air is supplied to all the power generation cells 101 while discharging water. There may also be contemplated another air supply system in which, as shown in FIG. 10, the air supply pipe 103 is divided into two systems, namely, air supply pipes 103a and 103b to thereby supply air. With these air supply systems, it is possible to constantly supply a sufficient quantity of air to all the power generation cells 101 and to remove water generated by association of hydrogen and oxygen from the gas conduits 102. However, these air supply systems are complicated in structure and are therefore not suited to a fuel cell for practical use. Besides, in the case of providing a greater quantity of electrical energy, the amount of water accumulated in the gas conduits 102 is also increased, so that it becomes difficult for air to flow smoothly in the gas conduits 102, thus making it very difficult, if not impossible, to achieve stable power generation.

SUMMARY OF THE INVENTION

An advantage of the present invention is to provide a fuel cell capable of performing stable power generation in which air is supplied to or exhausted from power generation cells by an air supply/exhaust mechanism capable of removing water accumulated in gas conduits with a simple structure, and a method of operating the same.

In an embodiment of the present invention, there is provided a fuel cell including power generation cells, and an air supply/exhaust mechanism for supplying air to or exhausting air from the power generation cells, wherein the air supply/exhaust mechanism includes a press control means for substantially periodically varying the pressure of air supplied to or exhausted from the power generation cells.

The air supply/exhaust mechanism for supplying air to or exhausting air from the power generation cells in the fuel cell according to an embodiment of the present invention has a structure in which a cylinder provided with a spiral form groove portion is disposed in an air supply pipe. A gap capable of supplying a fixed quantity of air to the power generation cells is formed between the inside wall of the air supply pipe and the surface of the cylinder. When the cylinder is rotated, air in a quantity greater than the quantity of air supplied into a gas conduit at steady-state time is supplied to each power generation cell through the groove portion. Due to the increase in the quantity of air supplied into the gas conduits connecting between the air supply pipe and the power generation cells, the pressure of air in the gas conduits is increased, whereby water generated in the power generation cells can be discharged.

The pressure control means in the fuel cell according to an embodiment of the present invention resides in that the cylinder provided with the spiral form groove portion in the surface thereof is rotated, whereby the quantity of air supplied to each power generation cell can be increased according to the rotation period of the cylinder, and the pressure of air supplied to or exhausted from the power generation cells can be varied substantially periodically. The quantity of air supplied in a fixed quantity and the quantity of air supplied to each power generation cell increased according to the rotation period of the cylinder can be set to required magnitudes by varying the cross sectional area of the gap between the air supply pipe and the cylinder and the cross sectional area of the groove portion provided in the surface of the cylinder. In addition, the period of the increase in the quantity of air supplied to each power generation cell can be varied by varying the revolution number of a shaft rotation motor for rotating the cylinder. Since the rotation period of the cylinder can be varied, optimum operating conditions can be set according to the conditions in generating power by the fuel cell.

In accordance with another embodiment of the present invention, there is provided a method of operating a fuel cell including a low-pressure air supply/exhaust step for supplying or exhausting air at a predetermined pressure, and a high-pressure air supply/exhaust step for supplying or exhausting air at a pressure higher than that in the low-pressure air supply/exhaust step, whereby the fuel cell is operated while substantially periodically varying the pressure of air supplied to or exhausted from power generation cells. In the fuel cell of the stack structure in which the power generation cells are disposed in parallel relative to an air supply pipe, water generated in the power generation cells disposed in parallel relative to the air supply or exhaust pipes can be removed by providing a pressure difference between the air supply and the air exhaust through the common air supply or exhaust pipes.

According to an embodiment of the present invention, at the time of supplying air to the power generation cells connected in parallel to the air supply or exhaust pipes, the cylinder provided with the spiral form groove portion is rotated in the air supply or exhaust pipes, whereby the pressure of air supplied to the power generation cells can be regulated, and water accumulated in the gas conduits which are air supply passages for the power generation cells can be discharged efficiently.

In addition, according to an embodiment of the present invention, it is possible to discharge water accumulated in the gas conduits and to supply constantly a fixed quantity of air to the power generation cells, so that it is possible to perform stable power generation continuously. Besides, since water as a by-product of power generation can be discharged by a simple air supply/exhaust mechanism, it is possible to manufacture a fuel cell small in size and high in performance.

Additional features and advantages of the present invention are described in, and will be apparent from, the following Detailed Description of the Invention and the figures.

BRIEF DESCRIPTION OF THE FIGURES

FIGS. 4A and 4B illustrate sectional views showing a cross sectional structure of an air supply pipe of the air supply/exhaust system according to an embodiment of the present invention.

FIGS. 5A, 5B and 5C show time variation diagrams of air amount showing the time variation of the quantity of air supplied to a power generation cell from the air supply/exhaust system according to an embodiment of the present invention. FIG. 5C is a time variation diagram of air amount for an n-th power generation cell according to an embodiment of the present invention.

DETAILED DESCRIPTION OF THE INVENTION

The present invention generally relates to fuel cells. In an embodiment, a fuel cell includes an air supply/exhaust mechanism capable of smoothly flowing air in gas conduits into which air is supplied and performing stable power generation as described below in detail with reference made to the drawings.

Figure 1:
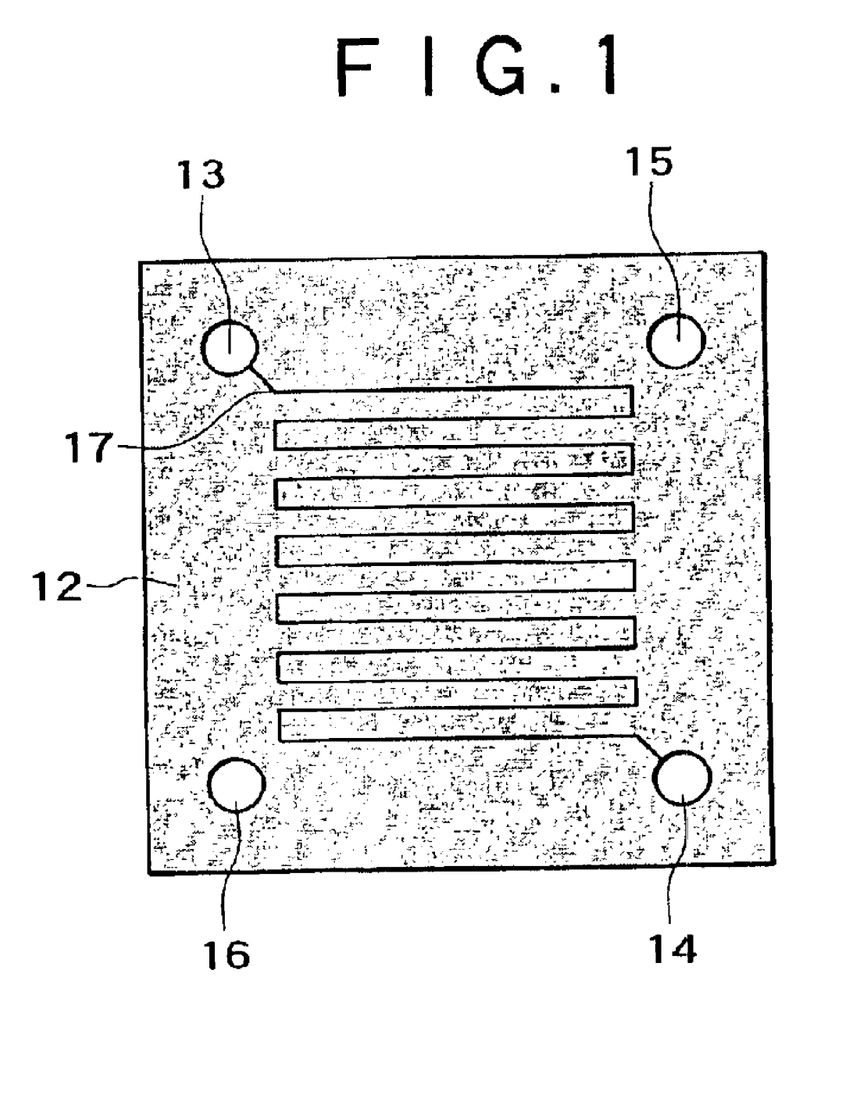
FIG. 1 is a perspective plan view showing the plan structure of a stack type fuel cell including an air supply/exhaust system according to an embodiment of the present invention.

FIG. 1 shows a perspective plan view of a fuel cell according to an embodiment of the present invention. An end plate 12 is disposed at an end face of a stack of power generation cells 11 to constitute the fuel cell as shown in FIGS. 1 and 2.

The end plate 12 is a thin sheet form in shape, and the outside shape thereof is rectangular according to an embodiment of the present invention. The outside shape is not limited to the rectangular shape, and it suffices that the outside shape is substantially the same as that of the stack of the power generation cells. In this regard, the outside shape of the end plate 12 may be circular, triangular or other polygonal shape according to the shape of the power generation cells. The end plate 12 is provided with an air supply port 13, an air exhaust port 14, a hydrogen supply port 15 and a hydrogen exhaust port 16, through which hydrogen gas as a fuel and air are supplied or exhausted. While the air and hydrogen supply or exhaust ports are provided at the four corners of the end plate 12 according to an embodiment, the positions of the supply or exhaust ports are not limited to the four corners of the end plate 12 but may be set at desired positions of the end plate 12.

The power generation cells 11 are provided with gas conduits 17 for supplying air from the air supply port 13 to reaction zones of the power generation cells 11 where oxygen reacts. The gas conduits 17 are communicated with the air exhaust port 14, and supply of air or exhaust of air after reaction are performed through the gas conduits 17. In the fuel cell according to an embodiment, supply or exhaust of air are performed through the air supply port 13 and the air exhaust port 14 which are provided in common for each power generation cell 11. In order to perform power generation at a high efficiency, the shape and the cross sectional area of the gas conduits are designed according to the power generation performance required. The gas conduit 17 is provided on one side of each separator 27 constituting the power generation cell 11 (FIG. 2), and FIG. 1 shows a perspective plan view taken through the end plate 12 illustrating the shape of the gas conduit 17. A gas conduit 18 (FIG. 2) connecting the hydrogen supply port 15 and the hydrogen exhaust port 16 is also designed according to the power generation performance required, in the same manner as the gas conduit 17 through which air flows.

Figure 2:
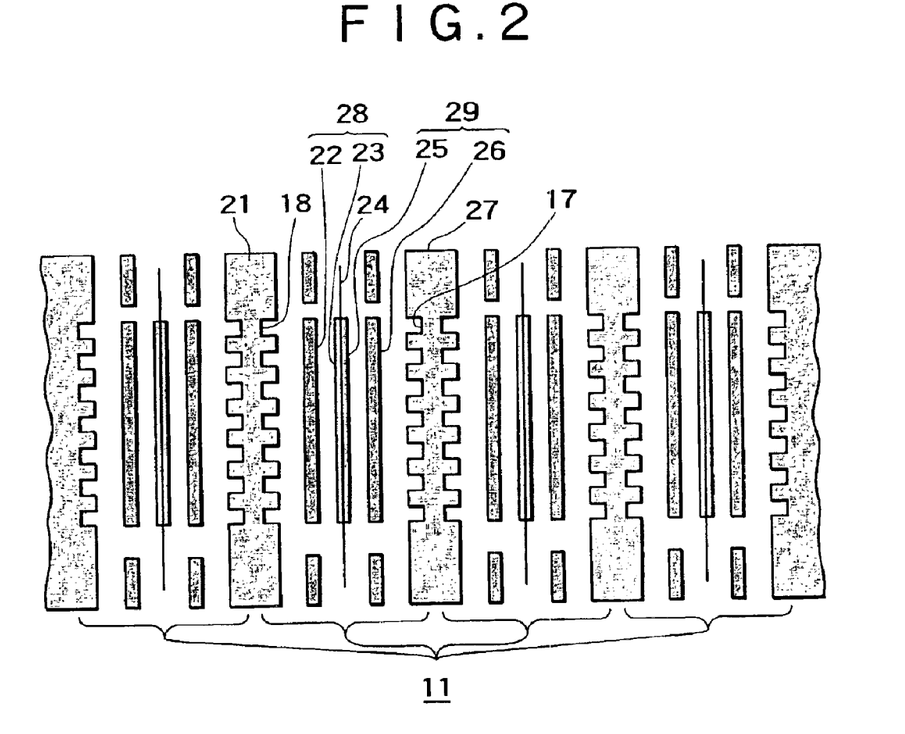
FIG. 2 is a sectional view showing a cross sectional structure of the stack type fuel cell including the air supply/exhaust system according to an embodiment of the present invention.

FIG. 2 shows a sectional structural view showing the structure of the fuel cell composed of a stack of power generation cells 11 according to an embodiment of the present invention. FIG. 2 is a sectional structural view showing a part of the fuel cell composed of a stack of the power generation cells 11. The power generation cell 11 includes a stack of a separator 21, a hydrogen diffusion layer 22, a catalyst film 23 for assisting conversion of hydrogen gas to hydrogen ions, and a solid polymer film 24 which is an electrolyte for movement of positively-charged hydrogen ions. Further, the power generation cell 11 includes an adhered stack of the film of the catalyst 23, a catalyst film 25 provided on the opposite surface of the solid polymer film 24, an oxygen diffusion layer 26 and a separator 27. A multiplicity of the unit power generation cells 11 are stacked to constitute the fuel cell. The portion composed by adhesion of the hydrogen diffusion layer 22 and the catalyst film 23 is a fuel pole 28, and the portion composed by adhesion of the oxygen diffusion layer 26 and the catalyst film 25 is an air pole 29.

The separator 21 is provided with the gas conduit 18 through which hydrogen gas supplied from the hydrogen supply port 15 flows. While the gas conduit 18 is rectangular in cross sectional shape in an embodiment, the cross sectional shape is not limited to a rectangular shape but may be semi-circular or polygonal other than rectangular. The separators 21 are partition plates for partitioning the power generation cells from each other, and play the role of preventing mixing of hydrogen and air in the structure of a stack of the power generation cells. Further, the separators 21 play also the role of electron conductors for series connection of the adjacent power generation cells 11. The separators 21 may be formed of any material which has good electron conductivity and high gas tightness for preventing mixing of hydrogen and air. The separator 21 is provided on its back side with a comb-shaped gas conduit for supplying air to the adjacent power generation cell 11.

It suffices that the gas conduit 18 is so formed that it can supply hydrogen gas to a surface of the fuel pole 28 composed of the hydrogen diffusion layer 22 and the catalyst film 23. In order to obtain a high power generation efficiency, it is only necessary that the gas conduit 18 is so disposed as to be capable of supplying hydrogen gas efficiently to the whole surface of the fuel pole 28. For example, when a comb-shaped conduit is provided at the surface of the separator 21 adhered to the fuel pole 28, the area of the fuel pole 28 for contact with hydrogen gas can be enlarged, and efficient power generation can be achieved. Further, when the width of the gas conduit 18 is reduced and the pitch of the repeating pattern of the gas conduit 18 arranged in a comb shape is reduced, the contact area between hydrogen gas and the fuel pole 28 can be further enlarged, and a further higher power generation efficiency can be obtained. For example, in the case of this embodiment, the width or depth of the gas conduit 18 is set at about 0.8 mm.

The fuel pole 28 is composed of the stack of the hydrogen diffusion layer 22 and the catalyst film 23, for efficient conversion of hydrogen gas to hydrogen ions. It suffices that the hydrogen diffusion layer 22 has such material and structure that hydrogen gas can easily permeate therethrough to contact the catalyst film 23. For example, a porous carbon film provided with minute holes for easy permeation of hydrogen gas therethrough can be used as the hydrogen diffusion layer 22. The catalyst film 23 can be formed by forming a uniform film of a thin metallic film having a catalytic action, such as platinum (Pt), like metals or combinations thereof on one side of the solid polymer film 24. The hydrogen diffusion layer 22 and the solid polymer film 24 provided thereon with the catalyst film 23 are stacked and adhered to each other, to constitute the fuel pole 28. Alternatively, the catalyst film 23 may be preliminarily formed on the hydrogen diffusion layer 22 to form the fuel pole 28, and then the fuel pole 28 and the solid polymer film 24 may be stacked.

The solid polymer film 24 is provided for moving hydrogen ions from the fuel pole 28 to the air pole 29. In this embodiment, in order to reduce the size of the fuel cell composed of a stack of the power generation cells 11, the thickness of the power generation cell 11 is about 1 mm to about 2 mm. At this time, the thickness of the solid polymer film 24 is about several tens of $\mu$m. Due to the gas pressure difference in the case of supplying hydrogen gas to the fuel pole 28 and supplying air to the air pole 29, a difference is generated between the pressures exerted on both sides of the solid polymer film 24, and a burden is exerted on the solid polymer film 24. The solid polymer film 24 has a sufficient strength for enduring the differential pressure between the pressures exerted on both sides thereof. In this regard, the fuel cell using the solid polymer film 24 can facilitate control of the gas pressures of hydrogen gas and air and thus pressurizing can be easily performed. As the material of the solid polymer film 24, for example, a fluoro-resin based sulfonic acid film having hydrogen ion conductivity may be used.

The air pole 29 is composed of a stack of the oxygen diffusion layer 26 and the catalyst film 25. The oxygen diffusion layer 26 has such material and structure that oxygen contained in air permeates readily therethrough. For example, a porous carbon film provided with minute holes for easy permeation of oxygen therethrough can be used as the oxygen diffusion layer 26. The catalyst film 25 can be formed by forming a uniform film of a thin metallic film having a catalytic action, such as Pt, like metals or combinations thereof on the solid polymer film 24. It is only necessary that the air pole 29 is formed when the oxygen diffusion layer 26 and the solid polymer film 24 provided thereon with the catalyst film 25 are stacked and adhered to each other. Alternatively, the catalyst film 25 may be preliminarily formed on the oxygen diffusion layer 26 to form the air pole 29.

The separator 27 is provided with the gas conduit 17 through which air supplied from the air supply port 13 flows. While the gas conduit 17 is rectangular in cross sectional shape in this embodiment, the cross sectional shape is not limited to rectangular but may be circular or polygonal other than rectangular. It suffices that the gas conduit 17 is so disposed that air can be efficiently supplied to the whole surfaces of the oxygen diffusion layer 26 and the catalyst film 25. The air pole 29 is formed upon adhesion of the oxygen diffusion layer 26 and the catalyst film 25. In order to supply air to the air pole 29 efficiently, it suffices to reduce the width of the gas conduit 17 and to reduce the pitch of the repeating pattern of the gas conduit 17 disposed in a comb shape. For example, in this embodiment, the width of the gas conduit 17 is about 0.8 mm.

In an embodiment, the fuel cell is formed by adhering the end plate 12 to on end face of the stack of the power generation cells 11 composed by stacking the power generation cells 11. The gas conduits for supplying air and hydrogen gas to the adjacent power generation cells are provided respectively on the back sides of the separators 21 and 27 of the power generation cells 11 thus stacked. Further, since the separators 21 and 27 have gas tightness for making it difficult for air and hydrogen gas to permeate therethrough and electron conductivity, the stacking of the power generation cells 11 results in series connection of the power generation cells 11. Although the voltage which can be generated per power generation cell 11 is not more than 1 V, the connection of the power generation cells 11 in series results in that a high voltage can be taken out from the fuel cell as a whole to the exterior. In addition, current collectors for taking out electric power to external circuits are adhered to both ends of the stack of the generation cells 11.

Figure 3:
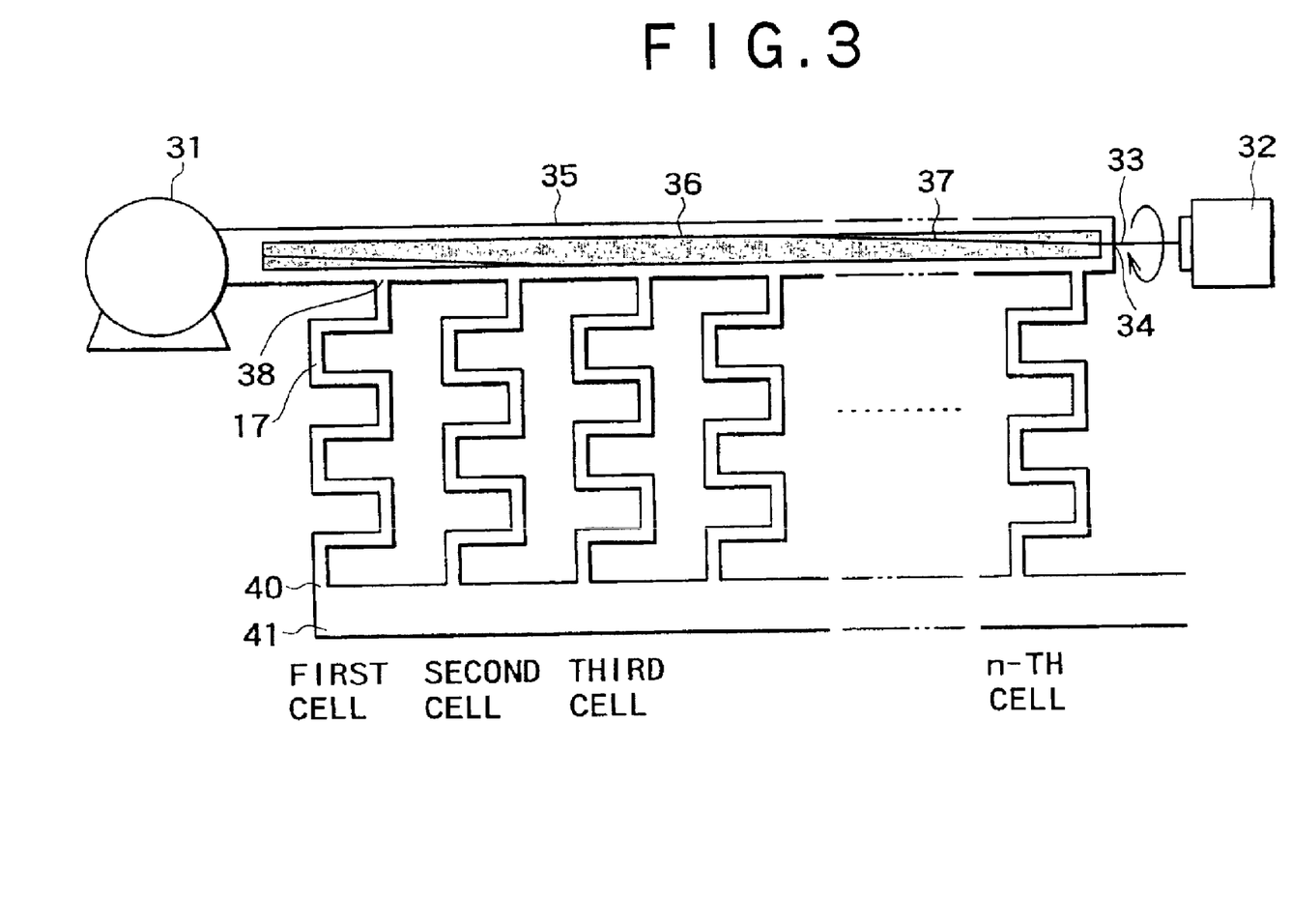
FIG. 3 is a schematic structural diagram showing the fuel cell according to an embodiment of the present invention.

FIG. 3 shows an air supply/exhaust mechanism used in the fuel cell according to an embodiment of the present invention. An air supply pipe 35 for supplying air containing oxygen is cylindrical in shape. An air supply pump 31 for supplying air into the air supply pipe 35 is connected to one end portion of the air supply pipe 35. The other end portion of the air supply pipe 35 is sealed, an insertion port 34 for insertion of a rotary shaft 33 is provided at the center of the other end portion, and the rotary shaft 33 is inserted in the insertion port 34 so that air supplied into the air supply pipe 35 does not leak therethrough. The rotary shaft 33 is connected to a shaft rotation motor 32 disposed in the exterior of the air supply pipe 35, and is rotated by the rotating force generated by the shaft rotation motor 32.

In the inside of the air supply pipe 35 is disposed a cylinder 36 for blocking and regulating a part of the flow of air in the air supply pipe 35 so as to regulate the quantity and pressure of air supplied to the power generation cells 11. The air supply pipe 35 is circular in cross sectional shape, and air is supplied from the air supply pump 31 into the air supply pipe 35 through an air supply port 13. The air supply pipe 35 is provided with supply ports 38 for feeding air to the power generation cells 11. The supply ports 38 are provided at the same intervals as the power generation cells 11, and all the supply ports 38 are the same in shape and size. While the supply ports 38 are circular in shape in an embodiment, it is only necessary for the supply ports 38 to be the same in shape and size. The shape of the supply ports 38 is not limited to circular but may be rectangular, triangular or other polygonal shape.

The cylinder 36 disposed in the inside of the air supply pipe 35 is rotated around an axis parallel to its longitudinal direction by a rotating force generated by the shaft rotation motor 32 through the rotary shaft 33. The surface of the cylinder 36 is provided with a groove portion 37 capable of selectively regulating the quantity and pressure of air supplied to the power generation cells 11. The groove portion 37 is formed in a spiral shape along the longitudinal direction of the cylinder 36, and is formed on the entire part of the cylinder 36 from one end portion to the other end portion of the cylinder 36. The diameter of the cross section of the cylinder 36 is slightly smaller than the diameter of the cross section of the air supply pipe 35, and the cylinder 36 is smoothly rotated inside the air supply pipe 35.

The gas conduits 17 for feeding air to the power generation cells 11 are connected to the supply ports 38, and air fed from the air supply pump 31 is supplied through the air supply pipe 35 and the supply ports 38 into the gas conduits 17. The air thus supplied into the gas conduits 17 flows through the comb-shaped gas conduits 17 to come into contact with the surfaces of the oxygen diffusion layer 26. Since the oxygen diffusion layer 26 is porous so that oxygen readily permeates therethrough, oxygen permeates to the back side of the oxygen diffusion layer 26 while spreading to the entire surface of the oxygen diffusion layer 26. Oxygen permeates through the oxygen diffusion layer 26 to reach the vicinity of the surface of the solid polymer film 25 provided thereon with the catalyst 25. At this time, since the gas conduits 17 are each comb-shaped, oxygen readily diffuses to the entire body of the oxygen diffusion layer 26, and the electrochemical reaction is performed efficiently.

On the other hand, air is supplied to the power generation cells 11, and a fixed quantity of hydrogen gas is supplied from the hydrogen supply port 15 through a hydrogen supply pipe (not shown) into the gas conduits 18 for hydrogen gas of the power generation cells 11. The hydrogen gas supplied into the gas conduits 18 disposed in a comb shape diffuses into the hydrogen diffusion layers 22 to reach the catalyst films 23 adhered to the back sides of the hydrogen diffusion layers 22. At this time, since the gas conduit 18 is comb-shaped, the hydrogen gas efficiently diffuses into the hydrogen diffusion layer 22 to reach the entire surface of the catalyst film 23, in the same manner as oxygen efficiently diffused into the oxygen diffusion layer 26. The hydrogen gas reaching the catalyst 23 is converted into hydrogen ions, which move through the solid polymer film 24, and are coupled with oxygen at the air pole 29 composed of the catalyst film 25 and the oxygen diffusion layer 26, forming water.

Air in which the amount of oxygen is reduced and water formed by association of hydrogen ions and oxygen flow through the gas conduits 17, and are discharged into an air exhaust pipe 41 through exhaust ports 40 connected to the gas conduits 17. The air exhaust pipe 41 is cylindrical in shape, one end portion thereof is sealed, and an air exhaust port 14 is opened at the other end portion thereof. The used air discharged from the air exhaust pipe 41 and water formed upon power generation are discharged to the exterior of the fuel cell through the air exhaust port 14. At this time, water may not be discharged if the pressure of air supplied into the gas conduits 17 is low. Particularly, when power generation amount is increased and the electrochemical reaction between hydrogen and oxygen become vigorous, the amount of water generated attendantly is increased, and the water may plug up the gas conduits 17. In the case of reducing the size of the fuel cell and raising the power generation efficiency so as to obtain higher performance, it is important to reduce the cross sectional area of the gas conduits 17 and to reduce the repetition pitch of the comb shape of the gas conduits 17 so as to increase the quantity of air brought into contact with the air poles 29. At this time, if water is not smoothly discharged from the gas conduits 17, air containing oxygen would not be supplied to the air poles 29, resulting in that required power generation cannot be achieved.

Figure 4A:
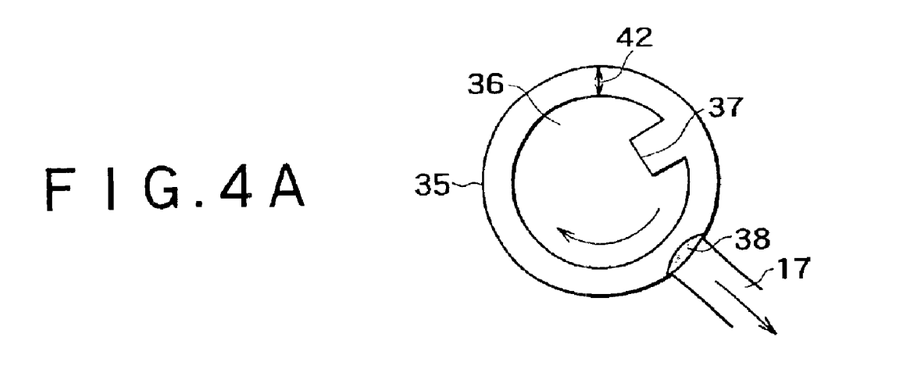
FIG. 4A is a structural sectional view showing the position of a groove portion in the case where a fixed quantity of air is supplied to a power generation cell according to an embodiment of the present invention.
Figure 4B:
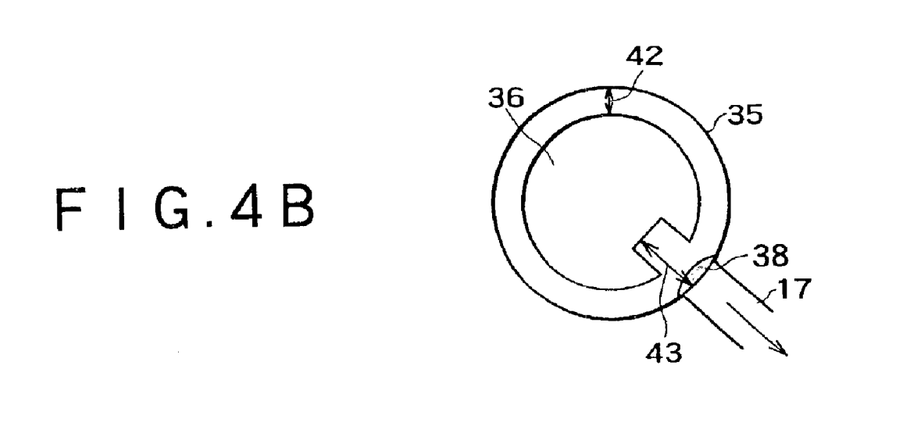
FIG. 4B is a sectional structural view showing the position of the groove portion in the case where the quantity of air supplied to the power generation cell is increased according to an embodiment of the present invention.

FIGS. 4A and 4B are sectional structural views showing the cross section of the air supply pipe 35. The center axis of the cylinder 36 smaller in diameter than the cross section of the air supply pipe 35 coincides with the center axis of the air supply pipe 35. Air supplied from the air supply pump 31 at uniform quantity and pressure flows through a gap 42 having a uniform width along the longitudinal direction which is formed between the cylinder 36 and the air supply pipe 35, and is supplied into the gas conduit 17 through the supply port 38.

At this time, the cylinder 36 is rotated around the rotary shaft 33 in the direction of the arrow by a rotating force generated by the shaft rotation motor 32. The surface of the cylinder 36 is provided with the groove portion 37 in a spiral shape along the axial direction of the cylinder 36, and, as shown in FIG. 4A, the groove portion 37 is also rotated in the direction of the arrow as the cylinder 36 is rotated. While the cross sectional shape of the groove portion 37 is rectangular in an embodiment, the cross sectional shape may be semi-circular or other polygonal shape. The groove portion 37 provided in the spiral shape along the axial direction of the cylinder 36 is required only to have the same shape at any cross section of the cylinder 36 and to be formed in the surface of the cylinder 36 in such a range that the groove portion 37 faces to all the supply ports 38.

With the cylinder 36 rotated, the groove portion 37 is disposed facing to the supply port 38 as shown in FIG. 4B. At this time, the cross sectional area of a gap 43 formed by the facing of the groove portion 37 to the supply port 38 is enlarged, as compared to the gap 42 between the surface of the cylinder 36 and the inside wall of the air supply pipe 35. A greater amount of air is supplied into the gap 43 through the groove portion 37 at an end portion of the cylinder 36, as compared to the amount of air supplied into the gap 42, so that a greater amount of air is supplied to the supply port 38 as compared to the case where the groove portion 37 is not facing to the supply port 38. Where air flows into the gas conduit 17 through the supply port 38 when the groove portion 37 faces to the supply port 38, the amount of air flowing in is large, but the cross sectional area of the gas conduit 17 is constant. In this regard, the pressure of air in the gas conduit 17 is higher than that in the case where air is supplied into the gas conduit 17 through the gap 42. By the air thus supplied at a higher pressure, water accumulated in the gas conduit 17 for supplying air to the air pole 29 is pushed out into the air exhaust pipe 41. At this time, since the surface of the cylinder 36 is provided with the groove portion 37 in the spiral shape along the axis of the cylinder 36, air at the high pressure sequentially flows into the individual gas conduits 17, and water accumulated in the gas conduits 17 is sequentially discharged into the air exhaust pipe 41. Since a fixed quantity of air can be supplied into the gas conduits 17 while sequentially discharging water accumulated in the gas conduits 17, the power generation cells 11 are supplied constantly with a fixed quantity of air at a lower pressure as compared with the pressure in the gas conduit relative to the discharge of water, and, therefore, stable power generation can be achieved.

Figure 5A:
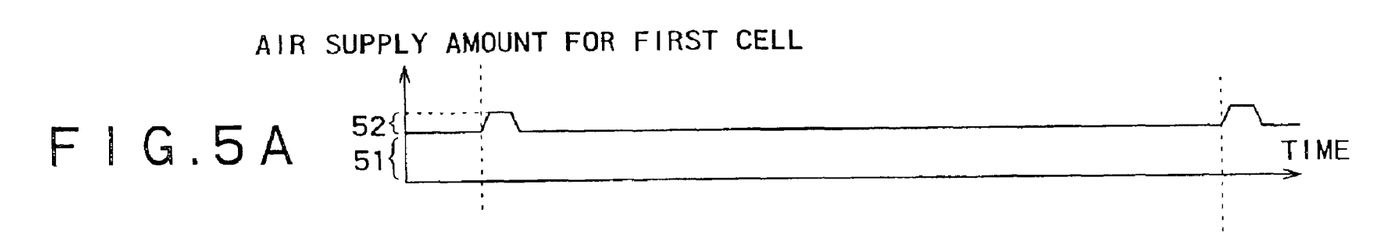
FIG. 5A is a time variation diagram of air amount for a first power generation cell according to an embodiment of the present invention.
Figure 5B:
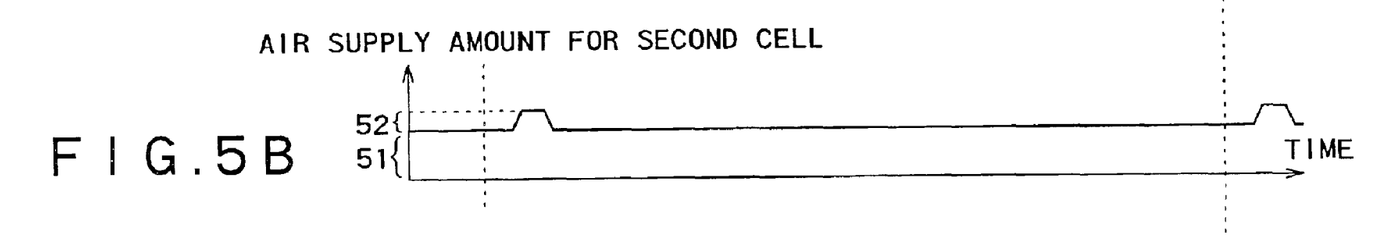
FIG. 5B is a time variation diagram of air amount for a second power generation cell according to an embodiment of the present invention.
Figure 5C:
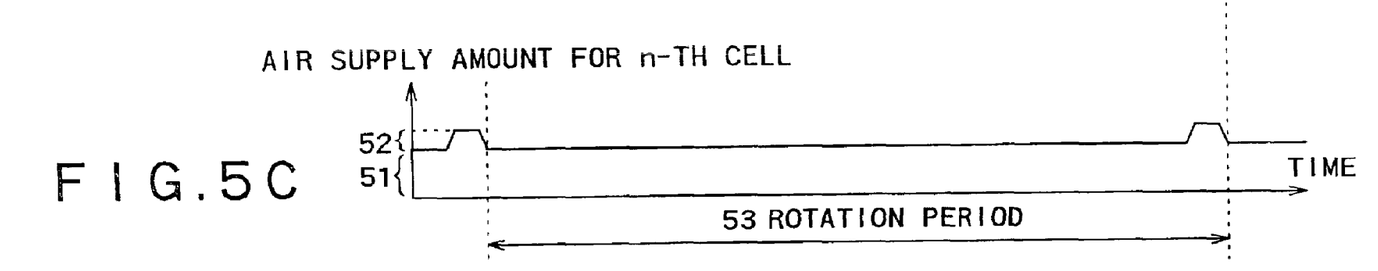

FIGS. 5A, 5B and 5C show gas flow rate charts showing the time variations of the amount of air supplied to each gas conduit 17. Since the groove portion 37 provided on the cylinder 36 for maintaining the quantity of air supplied from the air supply pump 31 to be constant is formed in the spiral shape, the rotation of the cylinder 36 leads to that a fixed time difference is generated between the time at which the groove portion 37 faces respectively to the individual supply ports 38. All the power generation cells 11 are constantly supplied with a fixed quantity 51 (described below with reference made to FIGS. 5A, 5B and 5C) of air through the gap 42 between the surface of the cylinder 36 not provided with the groove portion 37 and the inside wall of the air supply pipe 35.

FIG. 5A is a chart showing the time variation of the amount of air supplied to a first power generation cell. When the supply port 38 faces to the groove portion 37, an increment amount 52 of air is supplied to the supply port 38 in addition to the amount 51 of air constantly supplied. The increment amount 52 of air can be regulated according to the size of the cross sectional area of the groove portion 37. For example, by setting the width and the depth of the groove portion 37 to be large, the quantity of air flowing through the groove portion 37 can be increased, the quantity of air flowing into the supply port 38 when the groove portion 37 faces to the supply portion 38 can be enlarged, and the pressure of air in the gas conduit 17 can thereby be raised. With the cylinder 36 rotated further, the supply port 38 for supplying air to a second power generation cell faces to the groove portion 37, so that, as shown in FIG. 5B, the amount of air supplied to the gas conduit 17 is increased by the increment amount 52 as compared to the constant amount 51 of air constantly supplied to the gas conduit 17. At this time, the pressure of air in the gas conduit 17 for supplying air to the second power generation cell 11 is raised. Thus, the groove portion 37 is sequentially located at positions facing to the supply ports 38 for supplying air to the individual power generation cells 11, and, as shown in FIG. 5C, water accumulated in the gas conduits 17 can be sequentially discharged by the increment amount 52 of air supplied to the n-th power generation cell 11. Namely, by rotating the cylinder 36 provided with the spiral form groove portion 37, air is supplied at a higher pressure sequentially to the gas conduits 17, and water accumulated in the gas conduits 17 can be sequentially discharged. For example, where the width and the depth of the groove portion 37 are so set that the increment amount 52 of air is not less than two times the constant amount 51 of air, water accumulated in the gas conduits 17 can be sufficiently discharged. At this time, the power generation cells 11 located in such a range that the groove portion 37 and the corresponding supply ports 38 do not face to each other are supplied with the constant amount 51 of air, so that stable power generation can be achieved.

The period of increase of the amount of air supplied is varied by varying the revolution number of the shaft rotation motor 32 for rotating the cylinder 36. The rotation period 53 can be set by setting the revolution number of the shaft rotation motor 32 so that the amount of air supplied is increased with an appropriate period according to the power generation ability of the fuel cell and operating conditions such as temperature.

In addition, the regulation of the pressure of air in the gas conduits 17 and the discharge of water accumulated in the gas conduits 17 can also be achieved by not only arranging the cylinder 36 for regulating the amount of air supplied to the power generation cells 11 in the air supply pipe 35 but also arranging a cylinder 36 for regulating the amount of air exhausted in the air exhaust pipe 41. With the structure in which the cylinders each provided with a spiral form groove portion in the surface thereof are inserted in both of the air supply pipe 35 and the air exhaust pipe 41 and the pressures of air supplied and the pressure of air exhausted are regulated, water can be discharged more effectively as compared to the case where the cylinder 36 provided with the groove portion 37 is inserted only in the air supply pipe 35, and stable power generation can be performed continuedly.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A fuel cell comprising a plurality of power generation cells, and an air supply/exhaust mechanism capable of supplying air to or exhausting air from said power generation cells, wherein said air supply/exhaust mechanism comprises pressure control means for substantially periodically varying air pressure supplied to or exhausted from said power generation cells on a cell-by-cell basis.

2. The fuel cell of claim 1, wherein an air flow rate in said air supply/exhaust mechanism is substantially constant.

3. The fuel cell of claim 1, wherein said air supply/exhaust mechanism comprises a supply portion capable of supplying air to said power generation cells, and an exhaust portion capable of exhausting air from said power generation cells.

4. The fuel cell of claim 3, wherein said supply portion and said exhaust portion have cylindrical spaces.

5. The fuel cell of claim 1, wherein said pressure control means includes a cylindrical block-shaped body capable of blocking air, and a groove portion provided in said cylindrical block-shaped body.

6. The fuel cell of claim 5, wherein said groove portion includes a spiral shape in a surface of said cylindrical block-shaped body.

7. The fuel cell of claim 5, wherein air at a pressure substantially periodically controlled by rotation of said cylindrical block-shaped body is supplied to or exhausted from said power generation cells.

8. The fuel cell of claim 1, wherein water formed at said power generation cells is discharged by said pressure control means.

9. A method of operating a fuel cell for obtaining an electromotive force in said fuel cell by supplying air to or exhausting air from a plurality of power generation cells of the fuel cell, the method comprising the steps of:
   supplying air to or exhausting air from the fuel cell at a predetermined pressure;
   supplying air to or exhausting air from the fuel cell at a pressure higher than said predetermined pressure; and
   operating the fuel cell while substantially periodically varying air pressure supplied to or exhausted from said power generation cells, on a cell by cell basis.

10. A fuel cell comprising a plurality of power generation cells, and an air supply/exhaust mechanism capable of supplying air to or exhausting air from said power generation cells, wherein said air supply/exhaust mechanism comprises pressure control means for substantially periodically varying air pressure supplied to or exhausted from said power generation cells, wherein said pressure control means includes a cylindrical block-shaped body capable of blocking air, and a groove portion provided in said cylindrical block-shaped body.

11. The fuel cell of claim 10, wherein said groove portion includes a spiral shape in a surface of said cylindrical block-shaped body.

12. The fuel cell of claim 10, wherein air at a pressure substantially periodically controlled by rotation of said cylindrical block-shaped body is supplied to or exhausted from said power generation cells.

13. The fuel cell of claim 10, wherein water formed at said power generation cells is discharged by said pressure control means.

* * * * *